Figure 1:
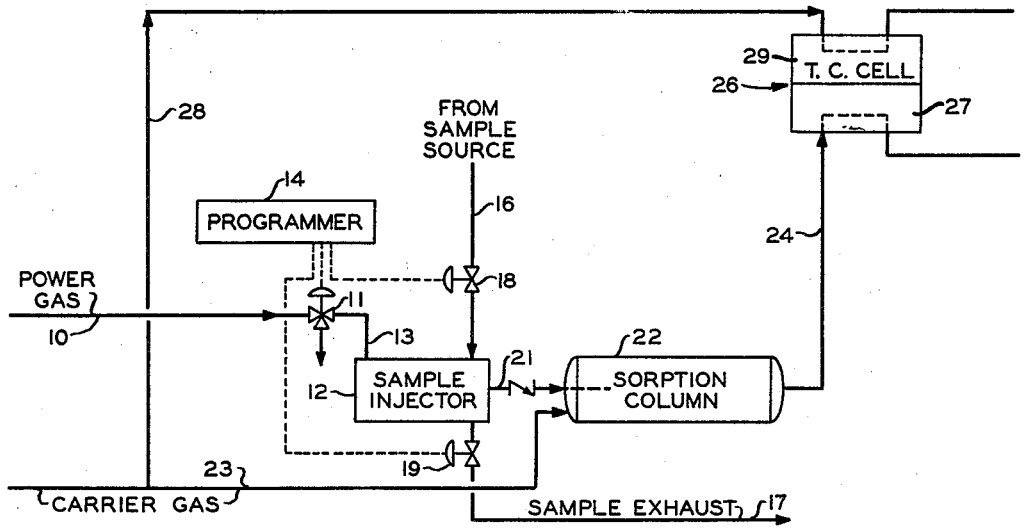

INVENTOR.
A. B. BROERMAN
BY
*Hudson & Young*
ATTORNEYS

3,103,807
LIQUID SAMPLE INJECTION IN A CHROMATOGRAPHIC APPARATUS
Arthur B. Broerman, Bartlesville, Okla., assignor to Phillips Petroleum Company, a corporation of Delaware
Filed July 8, 1960, Ser. No. 41,680
2 Claims. (Cl. 73—23)

This invention relates to a method and apparatus for supplying liquid sample slugs to the sorption column of a chromatographic analyzer.

Gas chromatography is a known method of analyzing fluid samples by preferential sorption and desorption. The desirability of using chromatography for such specific uses as fractionation control has been recognized for some time. Certain features of process chromatography, such as specific measurements, high sensitivity and simplicity of operation make this type of analyzer very attractive for use in automatic process control. There are, however, some inherent features of chromatography which appear to be obstacles in adapting chromatography to wide spread use in process control of all types of process streams. One of these difficulties is where it is necessary to leave the sampled fluid in liquid form before it enters the packed sorption column of the analyzer, rather than first vaporizing the sample liquid, as is most usually done, to facilitate partition of the components in the column.

The prior art teaches the injection of liquid samples into the carrier gas stream, usually by means of a hypodermic needle, or the like. Thus, the sample liquid is first entrained in the carrier gas and is, in this manner, introduced to the column inlet. In such a method of sample injection, the liquid may spill out into the voids in the inlet lines, and must be completely absorbed therefrom into the carrier gas stream in order for the entire injected slug to enter the column in which it is to be separated. Such erratic and delayed adsorption of the sample to be fractionated is simply not acceptable in high speed chromatographic analysis. Consequently, a method is needed for the injection of liquid sample that will avoid the trapping of the sample slug in the recesses of the column inlet conduits. Further it will reduce the dead space volume which a conventional inlet conduit entails in order to get the liquid sample slug fully dispersed in the carrier gas prior to entry to the column.

I have found that by providing a means for injection of the liquid sample directly onto the column packing material, that most of the difficulties previously associated with liquid sample injection are thereby resolved.

According to this invention, provision is made to extend the sample injection tube, preferably a hypodermic needle or a small capillary, into the column proper so as to be in close proximity to the column packing itself. In this manner, it is possible to inject micro-liter size samples into the analyzer without partial loss or hold-up of the liquid sample slug between the point of injection and the column packing. Moreover, this method of injection reduces the volume of the instrument, thereby increasing the efficiency of the column. It is theorized that the column packing forms a support or substrate that facilitates smooth and complete vaporization of the sample slug therefrom by flowing carrier gas.

This invention is suitable for the high speed analysis of any liquid sample stream that should not be volatilized prior to sorption column injection, and that will not decompose or vaporize at the ambient temperature and pressure of the injection chamber. This limitation on sample liquids suited to this method is necessary to insure achieving the very important sample size repeatability, which is here dependent upon mechanical displacement of a fixed volume of an incompressible fluid, i.e., a liquid sample slug, by the sample injection means of this invention.

It is, therefore, an object of this invention to provide a method and apparatus for supplying liquid sample slugs to the packed sorption column of a chromatographic analyzer. It is also an object to provide sample injection means which will insure complete and rapid deposition of the liquid sample slug in the fractionation column. It is still another object to provide an apparatus for liquid sample injection, of micro-liter size, that reduces the volume of the high speed analyzer and increases the efficiency of the sorption column.

Figure 2:
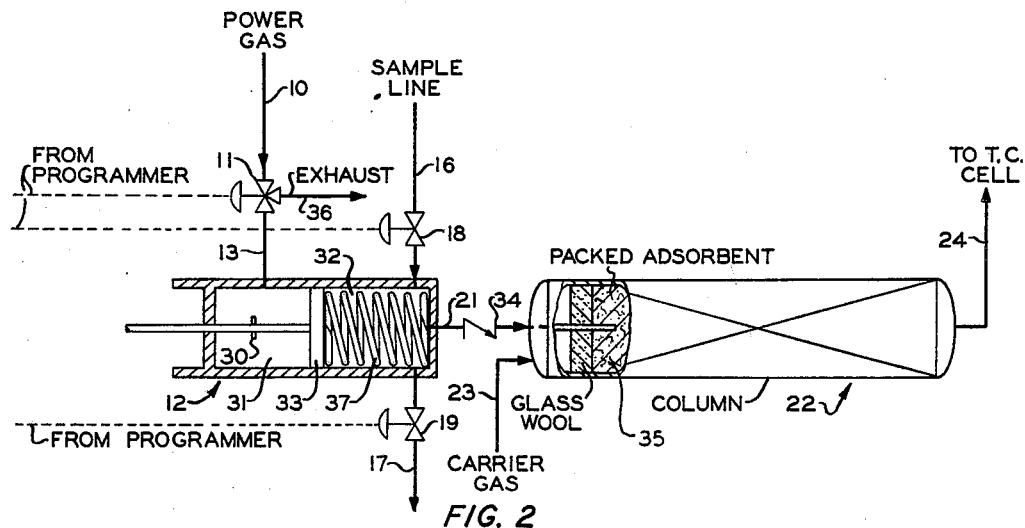

Various modifications and alterations of this invention will become apparent to those skilled in the art without departing from the scope and spirit of this invention, and it should be understood that the latter is not necessarily limited to the aforementioned discussion and accompanying drawing in which:

FIGURE 1 is a simplified flow sheet of a chromatographic analyzer system in which the injection means of this invention is used for liquid sample injection; and FIGURE 2 is an enlarged sectional view of the sample injection means of the apparatus of FIGURE 1.

Reference is now made to the drawing in detail, wherein like parts have been designated by like reference numerals, and to FIGURE 1 in particular, wherein power gas, such as air, passes via conduit 10 through automatic shut-off valve 11 from which the gas stream is directed to a first chamber (not shown) of a sample injector 12 via conduit 13. The power gas is alternately being admitted to or released from the said first chamber of the sample injector 12, as directed by programmer 14. A liquid sample stream from the process stream, introduced to sample injector 12 via conduit 16 is being circulated through the sample chamber (not shown) of sample injector 12, and then is exhausted therefrom via sample exhaust conduit 17. Periodically, as desired, programmer 14 directs the automatic shut-off valves 18 and 19 in conduits 16 and 17, respectively, to close, thereby trapping a volume of sample in the said sample chamber of injector 12. The trapped sample slug is then directed via conduit 21 to the inlet end of sorption column 22.

Simultaneously, a carrier gas, such as helium or hydrogen, is also passing continuously via conduit 23 to the inlet end of sorption column 22. The flowing carrier gas stream vaporizes the liquid sample being deposited on the packing (not shown) of column 22. The various constituents of the gaseous sample are spatially separated by a process of selective sorption and subsequent desorption from the packing by the carrier gas, which then carries the separated components out via conduit 24 to the sample side of thermal conductivity cell assembly, generally designated 26. Meanwhile, a stream of carrier gas is passing via conduit 28 from conduit 23 directly to the reference side 29 of detector 26, so as to balance out the effect of the carrier gas in the column 22 effluent stream. The output signal from thermal conductivity assembly 26 is passed to a recording instrument (not shown), which can be a conventional strip chart recorder.

The sample fluid to be analyzed generally enters sample injector 12 continuously through conduit 16 and exits via conduit 17, so long as programmer 14 holds valves 18 and 19 in the open position.

In FIGURE 2, there is shown an enlarged sectional view of the sample injection means and sorption column of FIGURE 1. In the first position of operation of sample injector 12, valves 18 and 19 are in the open position, and power gas is being released from the power gas chamber 31 of injector 22 via conduit 13 and to a valve 11. As a result, the sample fluid entering sample chamber 32 of injector 12 drives piston 33 to a retracted position. Pin 30 is fixed transversely through the shaft of piston 33, and limits the most retracted position thereof to the right side of power gas conduit 13.

After the injector chamber on the sample side of piston 33 is filled with sample fluid, programmer 14 passes a signal which closes valves 18 and 19, trapping a fixed volume of sample liquid within injector 12. A separate signal from programmer 14 given to valve 11 in the power gas line 10, permits flow therethrough to the power gas side of piston 33 via inlet conduit 13, driving the piston back toward the sample end of the chamber. The trapped sample slug, now under piston pressure, escapes from injector 12 via a small diameter injection tube 21, having check valve 34 therein. At its column end, conduit 21 deposits the liquid sample slug directly into the column packing 35 which provides a support from which carrier gas entering column 22 via inlet conduit 23 can pick up and vaporize sample liquid in the carrier stream passing through column 22.

When piston 33 reaches the end of its travel, another signal is given to control valve 11, reversing it, and now permitting power gas to escape from chamber 31 to exhaust via conduit 13, valve 11, and power gas exhaust conduit 36. Spring 37 begins to drive the piston back to the retracted position. Meanwhile, a signal from programmer 14 reopens valves 18 and 19, permitting the sample stream to re-enter expanding sample chamber 32 and filling the same. When piston 33 is fully retracted, sample injector 12 is now in the position to pass another liquid sample slug to sorption column 22, when so directed by programmer 14. The frequency with which a liquid sample slug is injected onto the packing of column 22 is determined by the cycle timing means (not shown) of programmer 14.

Although the injection means is described as applied to a chromatographic analyzer system, it is not limited thereto, but it can be employed in any situation where a micro-liter sized sample of an incompressible fluid must periodically be withdrawn from a sample stream, with sample size repeatability being insured.

Reasonable variations and modifications are possible within the scope of this disclosure without departing from the spirit and scope of the invention.

I claim:

1. A vapor phase chromatographic apparatus which comprises an elongated tubular column containing packed solid particles, first conduit means communicating with the inlet end of said column for supplying a carrier fluid thereto, an injection means for introducing a liquid mixture to be analyzed into the inlet end of said column onto the said packing therein, said injection means comprising an injection tube of small diameter, a chamber of fixed volume at the external end of said injection tube, a piston in sealing contact with and slidably disposed within said chamber, and means for moving said piston reciprocally within said chamber, and second conduit means for conducting the effluent from the outlet end of said column to means for detecting the components of the said fractionated liquid mixture, an inlet conduit communicating with said chamber for supplying said liquid mixture thereto, and an outlet conduit communicating with said chamber for conducting said liquid mixture therefrom, first and second valve means in said inlet and outlet conduits, respectively, for sealing said chamber while said piston is forcing said mixture into said tube, and biasing means disposed in said chambers for automatically withdrawing said piston when the closing force on said piston is released.

2. A vapor phase chromatographic apparatus which comprises an elongated tubular column containing packed solid particles, first conduit means communicating with the inlet end of said column for supplying a carrier fluid thereto an injection means for introducing a liquid mixture to be analyzed into the inlet end of said column onto the said packing therein, said injection means comprising an injection tube of small diameter, a chamber of fixed volume at the external end of said injection tube, a piston in sealing contact with and slidably disposed within said chamber, and means for moving said piston reciprocally within said chamber, and second conduit means for conducting the effluent from the outlet end of said column to means for detecting the components of the said fractionated liquid mixture, an inlet conduit communicating with said chamber for supplying said liquid mixture thereto, and an outlet conduit communicating with said chamber for conducting said liquid mixture therefrom, first and second motor valve means in said inlet and outlet conduits, respectively, for sealing said chamber while said piston is forcing said mixture into said tube, and biasing means disposed in said chamber for automatically withdrawing said piston when the closing force on said piston is released, programmer means operatively connected to said motor valves and preset to actuate the same, as frequently as is desired to inject a sample into said column packing; a power gas supply conduit, third motor valve disposed in said supply conduit, and said programmer also operatively connected to said third motor valve to actuate the same, synchronized with the closing of said first and second motor valves, permitting introduction of power gas to said chamber to force said piston to inject the liquid mixture into said injection tube.

References Cited in the file of this patent

F. G. Stanford: Sample Injection, in Analyst, vol. 84, 1959 (pages 321, 322).

Eggersten et al.: Gas Chromatography, in Analytical Chemistry, vol. 28, No. 3, March 1956 (pages 303, 304).

Langer et al.: Microsyringe, in Analytical Chemistry, vol. 30, No. 11, November 1958 (page 1889).

Scott: Vapor Phase Chromatography by Desty, Butterworths Scientific Publication, 1956 (pages 131, 132).

Nogare et al.: In Analytical Chemistry, vol. 30 (pages 894, 895).

Bodnar et al.: In Analytical Chemistry, vol. 30, No. 8 (pages 1384, 1385).